United States Patent
Chan et al.

(10) Patent No.: US 8,433,191 B2
(45) Date of Patent: *Apr. 30, 2013

(54) OPTICAL CHANNEL INTELLIGENTLY SHARED PROTECTION RING

(75) Inventors: Eric L. Chan, Naperville, IL (US); Matthew S. Vrba, Chicago, IL (US)

(73) Assignee: Tellabs Operations, Inc., Naperville, IL (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/787,071

(22) Filed: May 25, 2010

(65) Prior Publication Data

US 2010/0232783 A1    Sep. 16, 2010

Related U.S. Application Data

(63) Continuation of application No. 11/065,175, filed on Feb. 24, 2005, now Pat. No. 7,751,705.

(51) Int. Cl.
*G02F 1/00*    (2006.01)

(52) U.S. Cl.
USPC ............ 398/5; 398/3; 398/4; 398/59; 398/45; 370/218; 370/223; 370/217; 370/222; 370/225; 385/24; 385/16; 385/17; 385/18; 714/1; 714/2; 714/4; 709/235

(58) Field of Classification Search .................. 398/1, 2, 398/3, 4, 5, 7, 8, 58, 59, 79, 29, 30, 31, 33, 398/45, 48, 49, 50, 57, 10, 13, 17, 20, 83; 370/389, 238, 223, 221, 217, 225, 216, 218, 370/219, 220, 222, 224, 227, 229, 244, 352, 370/465, 242, 395.51, 395.31, 392, 426, 370/228, 360; 385/24, 37, 16, 17, 18; 714/1, 714/2, 4; 709/235

See application file for complete search history.

(56) References Cited

U.S. PATENT DOCUMENTS

| | | |
|---|---|---|
| 6,587,235 B1 | 7/2003 | Chaudhuri et al. |
| 6,587,241 B1 | 7/2003 | Saleh |
| 6,721,502 B1 | 4/2004 | Al-Salameh et al. |

(Continued)

FOREIGN PATENT DOCUMENTS

| | | |
|---|---|---|
| EP | 1 065 820 A | 1/2001 |
| EP | 1 265 452 A | 12/2002 |

OTHER PUBLICATIONS

Notification of Transmittal of the International Search Report and the Written Opinion of the International Searching Authority, or the Declaration, International Search Report and the Written Opinion in PCT Application No. PCT/US2006/003711, 13 pages, mailed Jun. 8, 2006.

Notification Concerning Transmittal of International Preliminary Report on Patentability and International Preliminary Report on Patentability in International Application No. PCT/US2006/003711, 9 pages, mailed Sep. 7, 2007.

*Primary Examiner* — Hanh Phan
(74) *Attorney, Agent, or Firm* — Hamilton Brook Smith & Reynolds, P.C.

(57) ABSTRACT

An optical ring network has one or more working wavelengths and multiple protection wavelengths adapted to support the working wavelength(s). Routing tables may be used in network nodes to assign traffic of a failed working wavelength to a protection wavelength. The protection technique may be applied to networks employing, for example, Dense Wave Division Multiplexing (DWDM).

38 Claims, 6 Drawing Sheets

Double Failure on OCh-iSPRing

U.S. PATENT DOCUMENTS

| | | |
|---|---|---|
| 6,771,852 B2 | 8/2004 | Hemenway et al. |
| 6,853,811 B2 | 2/2005 | Wahler et al. |
| 7,188,280 B2 | 3/2007 | Shinomiya et al. |
| 7,436,763 B1 | 10/2008 | Phelps et al. |
| 7,751,705 B2 * | 7/2010 | Chan et al. .................. 398/5 |
| 7,877,008 B2 * | 1/2011 | Li et al. ..................... 398/5 |
| 2002/0093954 A1 | 7/2002 | Weil et al. |
| 2004/0042711 A1 | 3/2004 | Bock et al. |
| 2004/0170426 A1 | 9/2004 | Fumagalli et al. |
| 2004/0264966 A1 * | 12/2004 | Lovisa et al. .............. 398/83 |

* cited by examiner

Initial State for Standard OCh-SPRing

Single Failure in Standard OCh-SPRing

Double Failure in Standard OCh-SPRing

Initial State of OCh-iSPRing

Single Failure on OCh-iSPRing

Double Failure on OCh-iSPRing

Initial State of OCh-iSPRing

OPTICAL CHANNEL INTELLIGENTLY SHARED PROTECTION RING

RELATED APPLICATION

This application is a continuation of U.S. application Ser. No. 11/065,175, filed Feb. 24, 2005 now U.S. Pat. No. 7,751,705. The entire teachings of the above application are incorporated herein by reference.

BACKGROUND OF THE INVENTION

Carriers continually attempt to increase availability/reliability in their network and to optimize use of protection bandwidth in their networks. Protection of optical channels can be achieved by different mechanisms such as a 1+1 protection mechanism, Optical Channel Dedicated Protection Ring (OCh-DPRing) mechanism, or Optical Channel Shared Protection Ring (OCh-SPRing) mechanism.

A standard OCh-SPRing mechanism provides efficient usage of protection bandwidth for certain traffic patterns because the protection bandwidth is shared amongst the circuits on the working bandwidth.

SUMMARY OF THE INVENTION

There are limitations to standard OCh-SPRing because each working wavelength has one and only one corresponding protection wavelength available to provide protection.

The principles of the present invention improve upon standard OCh-SPRing in a manner facilitating multiple protection wavelengths adapted to support one or more working wavelength(s) optionally in a manner facilitating the support of different priorities of traffic (e.g., Quality of Service (QoS) support). Accordingly, the improved OCh-SPRing may be referred to as Optical Channel Intelligently Shared Protection Ring (OCh-iSPRing).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Optical Channel Shared Protection Ring (OCh-SPRing) is a shared automatic protection switching mechanism used in an Optical Transport Network (OTN). OCh-SPRing consists of two wavelengths, where one wavelength is carrying one or more protected circuits and the other wavelength is either unused, carrying extra traffic, or used to carry one of the protected circuits. These two wavelengths are usually referred to as a working wavelength and a protection wavelength, respectively. When there is a failure or commanded switch on any working circuit, the protection wavelength is used to carry the working traffic. Extra traffic being carried on the protection wavelength is preempted in favor of the working traffic, if necessary. As defined in a draft of the ITU-T G.873.2 standard, OCh-SPRing (referred to as ODUk-SPRing in the draft of the standard) protects against one failure per OCh-SPRing.

A control plane solution to standard OCh-SPRing can be used to solve the problems associated with standard OCh-SPRing, where a network entity recalculates protection routes after a failure. The newly recalculated routes are then provisioned on Network Equipments (NEs) in the network so that the subsequent failure can be protected.

The control plane approach is very flexible, but complicated. The control plane approach requires a relatively long time to determine the next protection route after a failure, which increases the possibility of a traffic outage.

The principles of the present invention allow a ring network to survive multiple failures, including failures that occur at nearly the same time, due to decreased complexity and time to determine a next protection route after a failure.

Figure 1:
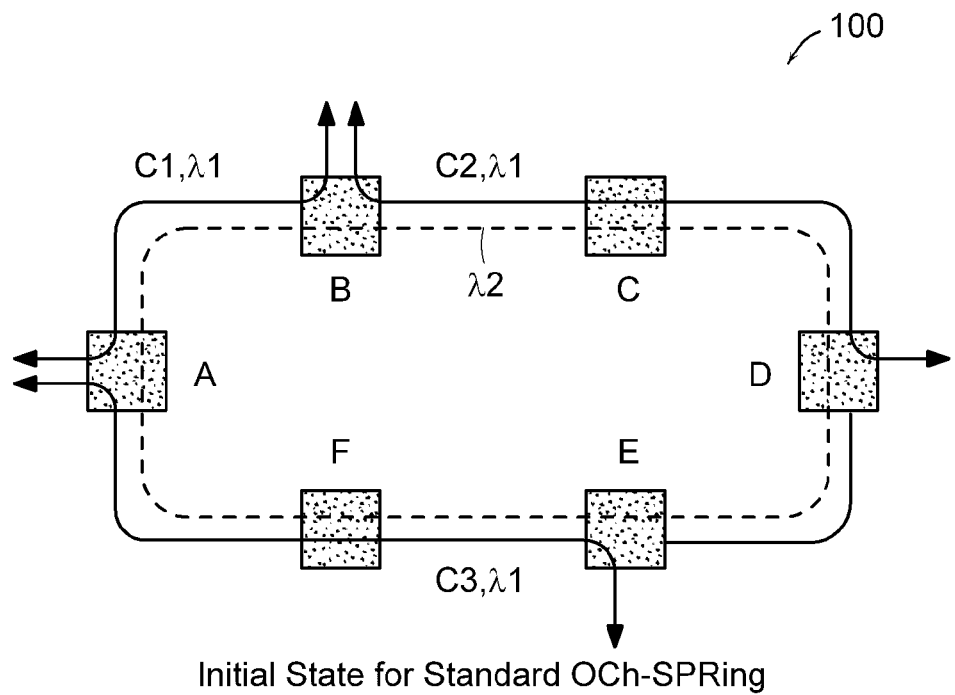
FIG. 1 is a network schematic diagram illustrating an initial state of a Dense Wave Division Multiplexing (DWDM) Optical Network in a standard Optical Channel Shared Protection Ring (OCh-SPRing) configuration.

FIG. 1 shows an initial state of a standard OCh-SPRing network 100 with three circuits (C1, C2, C3) provisioned around the ring on wavelength 1 ($\lambda 1$). The three circuits share the protection bandwidth provided by wavelength 2 ($\lambda 2$).

Figure 2:
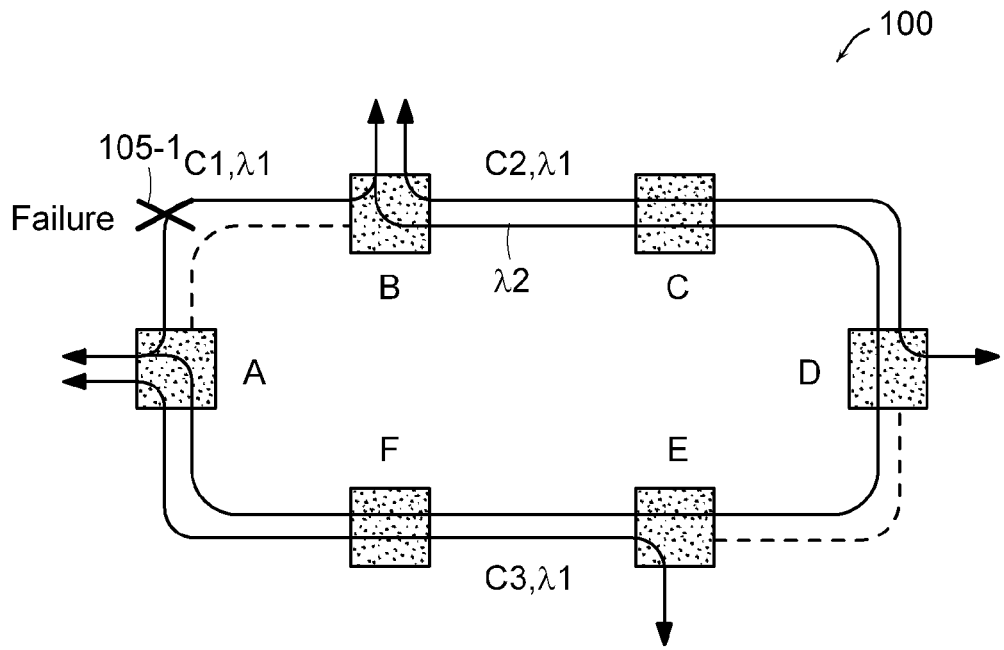
FIG. 2 is the network schematic diagram of FIG. 1 with a single failure in the standard OCh-SPRing.

FIG. 2 shows the standard OCh-SPRing network 100 with a failure on C1, $\lambda 1$. In response to this failure, end nodes (e.g., nodes A and B) bridge and switch the traffic (not shown but understood to travel on pathways interconnecting the nodes) to the protection wavelength $\lambda 2$ in the opposite direction around the ring, as understood in the art.

Figure 3:
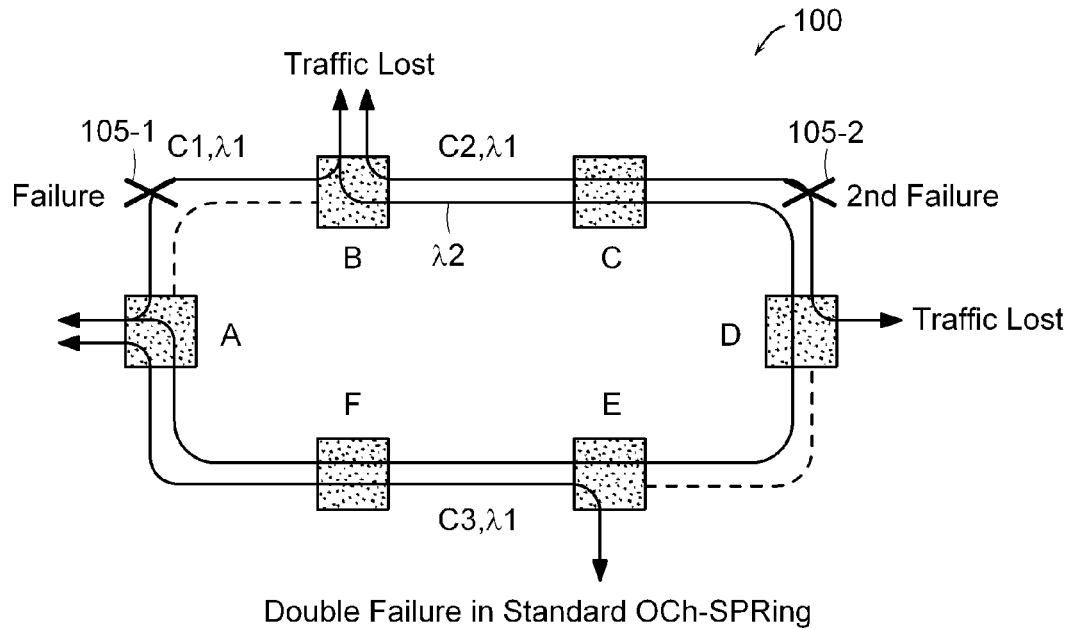
FIG. 3 is the network schematic diagram of FIG. 1 with a double failure in the standard OCh-SPRing.

As shown in FIG. 3, if a second failure occurs on $\lambda 1$, perhaps on C2, the only protection wavelength ($\lambda 2$) is already in use, so no protection switching can occur, and the traffic for C2, $\lambda 2$ is lost. This results in a traffic outage, which is highly undesirable to service providers relying on the OC-SPRing network 100 to provide services to customers.

To prevent a traffic outage due to a double failure, the standard version of OCh-SPRing can be enhanced, according to the principles of the present invention, to be an Optical Channel Intelligently Shared Protection Ring (OCh-iSPRing) to allow for a more flexible use of the protection wavelengths in a shared protection ring. OCh-iSPRing can be conceptualized as a resource pool of protection wavelengths protecting the working wavelengths, and a designator, variable setting, flag setting, or other means for indicating that the protection wavelengths are members of the pool may be employed so that nodes in the network know of their membership in the pool. Rather than having one and only one protection wavelength associated with each working wavelength, a "preferred" routing table, referred to hereafter as a "routing table," is created that allows the wavelengths to be considered as a shared pool of wavelengths. Nodes in the ring(s) communicate the status of each wavelength, and the OCh-iSPRing process intelligently selects which wavelength to use in order to restore traffic due to a failure. The routing table may be initialized with information about each wavelength, which is used to determine which protection wavelengths are available and which of these protection wavelengths should be used or are preferable over other protection wavelengths in an event a failure occurs.

As illustrated in FIGS. 4-7 and corresponding tables interspersed below in reference thereto, an OCh-iSPRing network 400 can survive multiple failures within an Optical Channel Ring and provide greater protection bandwidth utilization without the need for a more complicated coordination scheme in the network.

The OCh-iSPRing network 400 can support Quality of Service (QoS) allowing for different traffic priorities within a shared protection ring. The QoS feature allows the number of working wavelengths to be greater than the number of protecting wavelengths. For example, sixteen high priority wavelengths, eight medium priority wavelengths, and eight low priority wavelengths can be one configuration, and twenty-four working wavelengths and eight protecting wavelengths can be another configuration. This 8:24 protection is an example of an m:n protection mechanism. Note that the sixteen high priority wavelengths are always protected because they can pre-empt both medium and low priority wavelengths.

The OCh-iSPRing network 400 can restore traffic despite multiple failures on the same optical channel (e.g., multiple OCh failures, multiple DWDM link failures, combinations of OCh and DWDM link failures). The OCh-iSPRing network 400 allows a working wavelength to have the option of using multiple protection wavelengths.

In a preferred routing table associated with an OCh-iSPRing network 400 (see Tables 1-12 below), every working wavelength may have a primary protection wavelength. If a working wavelength's primary protection wavelength is busy (e.g., in use protecting a working wavelength or carrying extra traffic), then a different wavelength's primary protection wavelength can be used. The preferred routing table is set-up to determine which protection wavelengths are available and which of the available wavelengths should be used should a failure occur.

Figure 4:
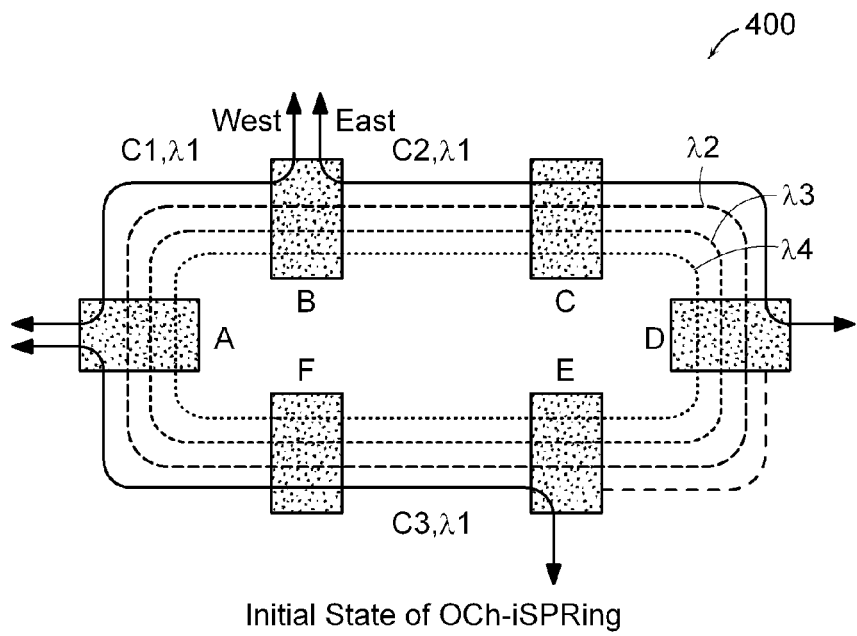
FIG. 4 is a network schematic diagram illustration an initial state of a DWDM network in an Optical Channel Intelligently Shared Protection Ring (OCh-iSPRing) configuration according the principles of the present invention.

FIG. 4 shows a Dense Wave Division Multiplexing (DWDM) network 400 with wavelengths 1, 2, 3, and 4 ($\lambda 1$, $\lambda 2$, $\lambda 3$, and $\lambda 4$, respectively) configured for OCh-iSPRing. With no failures in the network 400, the OCh-iSPRing network 400 looks the same as a standard set of OCh-SPRings.

In this example, $\lambda 3$ is a working wavelength with circuits 1 and 2 (C1 and C2) configured, but not shown for simplicity. If shown, one would see $\lambda 3$ provides a communications path between nodes B and F and $\lambda 3$, C2 provides a communications path between node F and E. In this example, $\lambda 4$ is the primary protection wavelength for $\lambda 3$, and $\lambda 2$ is the primary protection wavelength for $\lambda 1$.

When a user creates an OCh-iSPRing connection at a DWDM interface, the user adds to an associated routing table the working and primary protection wavelengths in an embodiment in which primary protection wavelengths are designated. Each DWDM interface in an OCh-iSPRing network 400 has a corresponding preferred routing table. In the example of FIG. 4, there may be twelve preferred routing tables, one at each DWDM interface. The routing tables may contain the following information:

Indexed Lambda Value—This is a wavelength index that provides a mapping between an integer and the provisioned wavelength.

Protection Role—Options are "unassigned," "OCh-iSPRing Working," or "OCh-iSPRing Protecting."

Ring ID—provisioned value that uniquely identifies the OCh-Ring in a network.

Circuit ID—provisioned value that uniquely identifies the OCh circuit in an OCh-Ring.

Extra Traffic—identifies whether or not extra traffic is being supported on the protection wavelength.

In Use—identifies whether or not the wavelength is in use (e.g., protecting wavelength is "in use" when protecting traffic of a failed working wavelength).

Reference Lambda Index—for a working wavelength, this identifies which protection wavelength is providing the protection; for a protection wavelength, this identifies which working wavelength is being protected.

Failure Priority—identifies the priority of the failure that is being protected against and is used for preemption in a case where no other protection wavelengths are available. Note that failure priority is upgraded if a higher priority failure occurs on a previously failed circuit.

State and Sub-State—protection switch states. In the tables below, "SW" indicates "Switched;" "BR" indicates "Bridged;" "!SW" indicates "not Switched;" and "!BR" indicates "not Bridged."

Quality of Service—Quality of Service is used to specify priority levels of each wavelength. It allows the pre-emption of traffic on a lower priority wavelength so that a higher priority failure can be protected.

For the OCh-iSPRing network 400 shown in FIG. 4, the routing table at the interface on the West side of Node B (towards Node A) may be configured as follows:

TABLE 1

Table at West side of Node B in FIG. 4

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | | | "Idle" | "!BR & !SW" | |
| 2 | "OCh-iSPRing Protecting" | | | "No" | "No" | | | | | |
| 3 | "OCh-iSPRing Working" | 129 | 1 | | | | | "Idle" | "!BR & !SW" | |
| 4 | "OCh-iSPRing Protecting" | | | "No" | "No" | | | | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |

TABLE 1-continued

Table at West side of Node B in FIG. 4

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 9 | "Unassigned" | | | | | | | | | |
| . | | | | | | | | | | |
| . | | | | | | | | | | |
| . | | | | | | | | | | |
| n | "Unassigned" | | | | | | | | | |

Note that table cells that are null or not applicable contain no content in the example tables herein for easy reading. However, it should be understood that these cells may be filled with related or unrelated information in various embodiments.

For the OCh-iSPRing network 400 shown in FIG. 4, the routing table at the interface on the East side of Node B (towards Node C) may be configured as follows:

TABLE 2

Table at East Side of Node B in FIG. 4

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 2 | | | | | "Idle" | "!BR & !SW" | |
| 2 | "OCh-iSPRing Protecting" | | | "No" | "No" | | | | | |
| 3 | "OCh-iSPRing Working" | 129 | | | | | | | | |
| 4 | "OCh-iSPRing Protecting" | | | "No" | "No" | | | | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| . | | | | | | | | | | |
| . | | | | | | | | | | |
| n | "Unassigned" | | | | | | | | | |

When a failure occurs on C1, λ1, the interface at the West Side of Node B uses the respective routing table (Table 1) to determine which protection wavelength to use. An OCh-iSPRing process cycles through the entire table, beginning in some embodiments with the entry below the working wavelength that has failed, looking for an entry that has Protection Role=OCh-iSPRing Protect, In Use=No, and Extra Traffic=No. The first entry that meets this criteria is used to restore the traffic of the failed working circuit. If there are no entries that meet all three criteria, the search is performed without considering the Extra Traffic parameter. The first entry that has Protection Role=OCh-iSPRing Protecting and In Use=No is used in this case. If no entries match this criteria either, then the pre-emption rules defined in standard OCh-SPRing (e.g., Failure Priority) may be followed or some other rule (e.g., Quality of Service) may be applied.

Another way to describe cycling through table entries for a 32 wavelength DWDM interface is to say that the protection wavelength to use is the lowest value of n such that the wavelength number=mod 32 (working wavelength+1+2n) is marked as available and not in use. Note that valid values of n are 0 through 15 for a 32 wavelength DWDM interface. In this case, the primary protection wavelength λ2 is selected because it is the next table entry down from λ1 and has Protection Role=OCh-iSPRing Protect and In Use=No.

Figure 5:
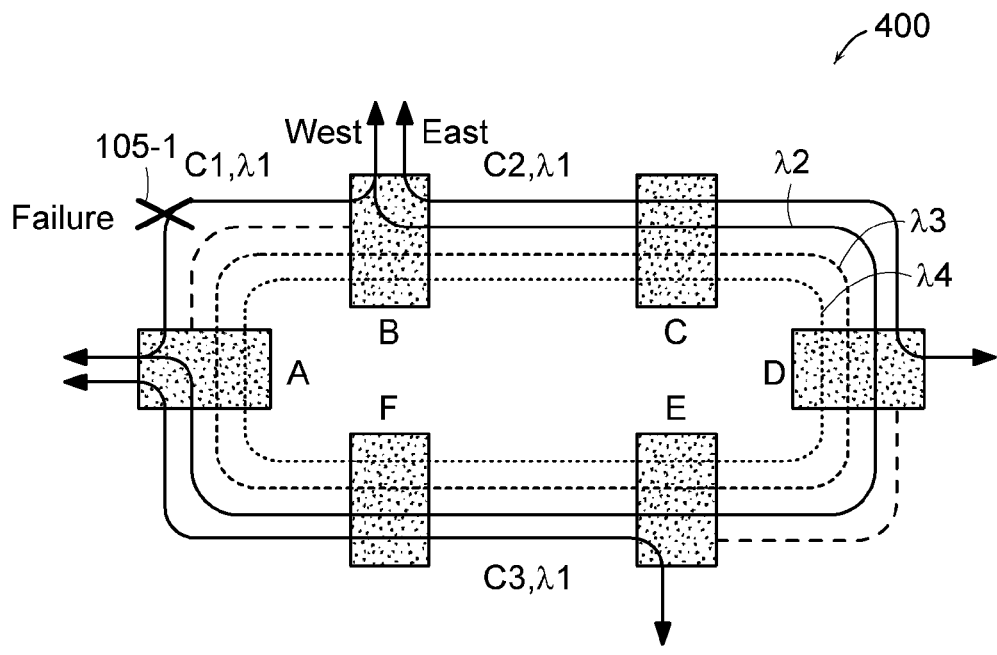
FIG. 5 is the network schematic diagram of FIG. 4 with a single failure in the OCh-iSPRing.

FIG. 5 shows the DWDM ring 400 after a protection switch to λ2 as a result of a single failure 105-1 on C1, λ1.

As the protection switch is processed, the routing tables around the ring are updated by Automatic Protection Switching (APS) messages (not shown) being communicated to the nodes of the ring 400 and by the processing that occurs at the end nodes, such as end nodes A and D.

At Node B, West side, for Indexed Lambda Value 2, the In Use field for Indexed Lambda Value 2 is changed to "Yes," and the Reference Lambda Index is set to "1," which corresponds to the working wavelength that is being protected. The Ring ID and Circuit ID are set to the IDs that are now being supported on the protection wavelength. The Reference Lambda Index for Indexed Lambda Value 1 is set to "2," which corresponds to the protection wavelength that is carrying the traffic for circuit C1.

TABLE 3

Table at West Side of Node B in FIG. 5

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | 2 | "SF" | "Switch" | "BR & SW" | |
| 2 | "OCh-iSPRing Protecting" | 128 | 1 | "No" | "Yes" | 1 | "SF" | "Switch" | | |
| 3 | "OCh-iSPRing Working" | 129 | 1 | | | | | "Idle" | "!BR & !SW" | |
| 4 | "OCh-iSPRing Protecting" | | | "No" | "No" | | | | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| . | | | | | | | | | | |
| . | | | | | | | | | | |
| n | "Unassigned" | | | | | | | | | |

At Node B, East side, for Indexed Lambda Value 2, the In Use field for Indexed Lambda Value 2 is changed to "Yes," and the Reference Lambda Index is set to "1," which corresponds to the working wavelength that is being protected. The Ring ID, Circuit ID, and failure priority for lambda value 2 are set to the appropriate values of the failing wavelength that has been protected.

TABLE 4

Table at East Side of Node B in FIG. 5

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 2 | | | | | "Idle" | "!BR & !SW" | |
| 2 | "OCh-iSPRing Protecting" | 128 | 1 | "No" | "Yes" | 1 | "SF" | "Switch" | | |
| 3 | "OCh-iSPRing Working" | 129 | | | | | | | | |
| 4 | "OCh-iSPRing Protecting" | | | "No" | "No" | | | | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| . | | | | | | | | | | |
| . | | | | | | | | | | |
| n | "Unassigned" | | | | | | | | | |

At Node C, West side, for Indexed Lambda Value 2, the In Use field for Indexed Lambda Value 2 is changed to "Yes," and the Reference Lambda Index is set to "1," which corresponds to the working wavelength that is being protected. The Ring ID and Circuit ID are set to the IDs that are being supported on the protection wavelength.

TABLE 5

Table at West Side of Node C in FIG. 5

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | | | | | | | | |
| 2 | "OCh-iSPRing Protecting" | 128 | 1 | "No" | "Yes" | 1 | "SF" | "Switch" | | |
| 3 | "OCh-iSPRing Working" | 129 | | | | | | | | |
| 4 | "OCh-iSPRing Protecting" | | | "No" | "No" | | | | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |

TABLE 5-continued

Table at West Side of Node C in FIG. 5

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 9 | "Unassigned" | | | | | | | | | |
| . | | | | | | | | | | |
| . | | | | | | | | | | |
| . | | | | | | | | | | |
| n | "Unassigned" | | | | | | | | | |

Figure 6:
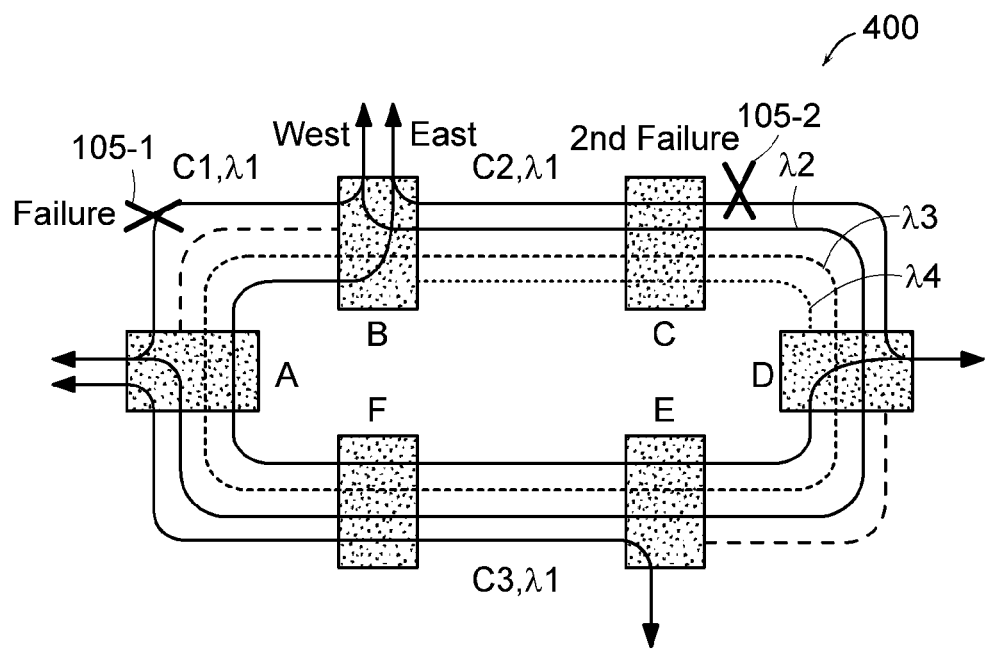
FIG. 6 is the network schematic diagram of FIG. 4 with a double failure in the OCh-iSPRing.

Referring now to FIG. 6, when a second failure occurs on $\lambda 1$, perhaps on C2, the interface at the East side of Node B uses the associated routing table to determine which protection wavelength to use, as described in the first failure case. In this second failure case, the primary protection wavelength $\lambda 2$ cannot be selected because In Use=Yes. A 50 msec delay or other suitable delay is added before the process continues to avoid a race condition in the case of a large number of simultaneous failures that can be caused by a fiber cut. After the delay, the process continues and moves down to Indexed Wavelength Value 4, which meets the criteria of being marked for protection and not being in use or having Extra Traffic (ET). Therefore, traffic is switched from C2, $\lambda 1$ to protection $\lambda 4$, as shown in FIG. 6, and multiple failures on a single ring is survived.

As the protection switch is processed, the routing tables around the ring are again updated by APS messages being communicated to the nodes on the ring and the processing that occurs at the end nodes. At Node B, East side, for Indexed Lambda Value 4, the In Use field for Indexed Lambda Value 4 is changed to "Yes," and the Reference Lambda Index is set to "1," which corresponds to the working wavelength that is being protected. The Ring ID and Circuit ID are set to the IDs that are being supported on the protection wavelength. The Reference Lambda Index for Indexed Lambda Value 1 is set to "4," which corresponds to the protection wavelength that is carrying the traffic for circuit C2.

TABLE 6

Table at East Side of Node B in FIG. 6

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 2 | | | 4 | "SF" | "Switch" | "BR & SW" | |
| 2 | "OCh-iSPRing Protecting" | 128 | 1 | "No" | "Yes" | 1 | "SF" | "Switch" | | |
| 3 | "OCh-iSPRing Working" | 129 | 2 | | | | | "Idle" | "!BR & !SW" | |
| 4 | "OCh-iSPRing Protecting" | 128 | 2 | "No" | "Yes" | 1 | "SF" | "Switch" | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| . | | | | | | | | | | |
| . | | | | | | | | | | |
| n | "Unassigned" | | | | | | | | | |

At Node B, West side, for Indexed Lambda Value 4, the In Use field for Indexed Lambda Value 4 is changed to "Yes," and the Reference Lambda Index is set to "1," which corresponds to the working wavelength that is being protected. The Ring ID and Circuit ID are set to the IDs that are being supported on the protection wavelength.

Figure 7:
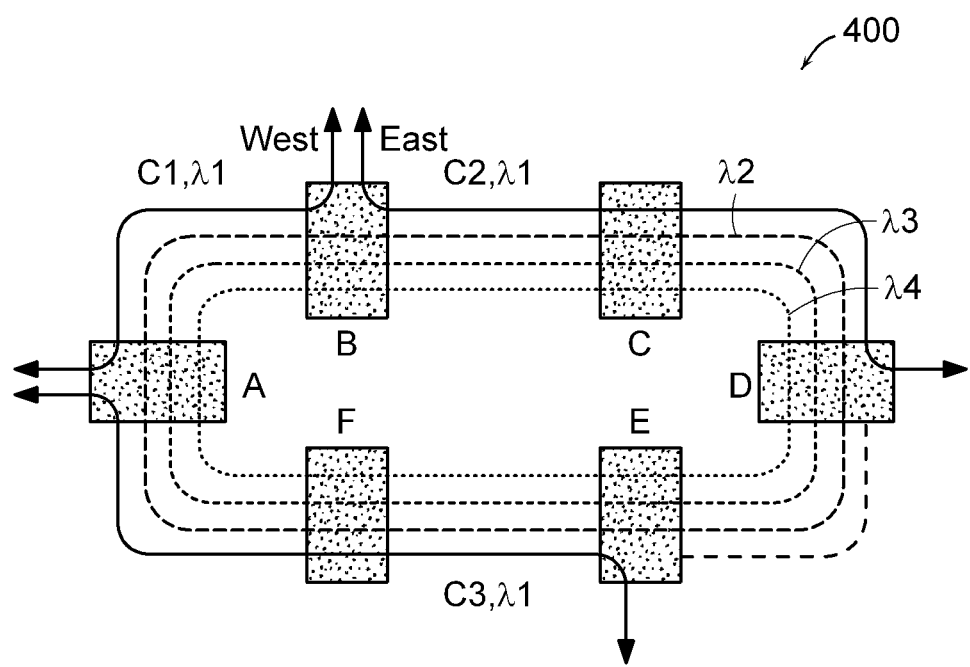
FIG. 7 is a network schematic diagram similar to the network schematic diagram of FIG. 4.

FIG. 7 shows a DWDM network 400 with wavelengths 1, 2, 3, and 4 configured for OCh-iSPRing. In this example, λ1 is a high priority working wavelength with circuits 1, 2, and 3. λ3 is a high priority working wavelength with circuits 1 and 2 configured, but not shown for simplicity. Although not

TABLE 7

Table at West Side of Node B in FIG. 6

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | 2 | "SF" | "Switch" | "BR & SW" | |
| 2 | "OCh-iSPRing Protecting" | 128 | 1 | "No" | "Yes" | 1 | "SF" | "Switch" | | |
| 3 | "OCh-iSPRing Working" | 129 | | | | | | | | |
| 4 | "OCh-iSPRing Protecting" | 128 | 2 | "No" | "Yes" | 1 | "SF" | "Switch" | | |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| . | | | | | | | | | | |
| . | | | | | | | | | | |
| n | "Unassigned" | | | | | | | | | |

As new OCh-iSPRing wavelengths are added to a DWDM ring or existing OCh-iSPRings are modified, the related configuration information is communicated to all nodes on the ring so that the routing tables can be updated. A possible method for communicating configuration messages around a ring may be over communication channels, maintenance channels, or other channels used for such purposes. The configuration messages may be sent in overhead or payload portions of the channel(s) used for this purpose or other purposes.

shown, λ3, C1 provides for communications between nodes B and F, and λ3, C2 provides for communication between node F and E. λ2 is configured as a protection wavelength. λ2 is a medium priority wavelength that carries working traffic and can also protect a high priority wavelength. λ4 is a low priority protection wavelength that can carry extra traffic and can protect medium and high priority wavelengths.

With no failures present in the network 400, the preferred routing table at the West side of Node B may be configured as follows:

TABLE 8

Table at West Side of Node B in FIG. 7

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | | | "Idle" | "!BR & !SW" | 1 |
| 2 | "OCh-iSPRing Protecting" | | | "Yes" | "No" | | | | | 2 |
| 3 | "OCh-iSPRing Working" | 129 | 1 | | | | | "Idle" | "!BR & !SW" | 1 |
| 4 | "OCh-iSPRing Protecting" | | | "No" | "No" | | | | | 3 |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| . | | | | | | | | | | |
| . | | | | | | | | | | |
| n | "Unassigned" | | | | | | | | | |

When a failure occurs on λ1, C1, the OCh-iSPRing process chooses λ4 as the protection wavelength since it is not in use, e.g., has no Extra Traffic, and has a lower priority than λ2. Traffic on λ1, C1 is restored after switching to λ4. The routing table may be configured as follows:

TABLE 9

Table at West side of Node B in FIG. 7

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | | "SF" | "Switch" | "BR & SW" | 1 |
| 2 | "OCh-iSPRing Protecting" | | | "Yes" | "No" | | | | | 2 |
| 3 | "OCh-iSPRing Working" | 129 | 1 | | | | | "Idle" | "!BR & !SW" | 1 |
| 4 | "OCh-iSPRing Protecting" | 128 | 1 | "No" | "Yes" | 1 | "SF" | | | 3 |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| n | "Unassigned" | | | | | | | | | |

At some later time, a failure can also occur on λ3, C1. The m:n OCh-iSPRing process scans the routing table and chooses λ2 because it has a lower priority than λ3, is not in use for protection, and no other wavelengths are available. Any extra traffic being carried on λ2 is preempted. The preferred routing table may be configured as follows:

TABLE 10

Table at West side of Node B in FIG. 7

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | | "SF" | "Switch" | "BR & SW" | 1 |
| 2 | "OCh-iSPRing Protecting" | 129 | 1 | "Yes" | "Yes" | 3 | "SF" | | | 2 |
| 3 | "OCh-iSPRing Working" | 129 | 1 | | | | "SF" | "Switch" | "BR & SW" | 1 |
| 4 | "OCh-iSPRing Protecting" | 128 | 1 | "No" | "Yes" | 1 | "SF" | | | 3 |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| n | "Unassigned" | | | | | | | | | |

Figure 8:
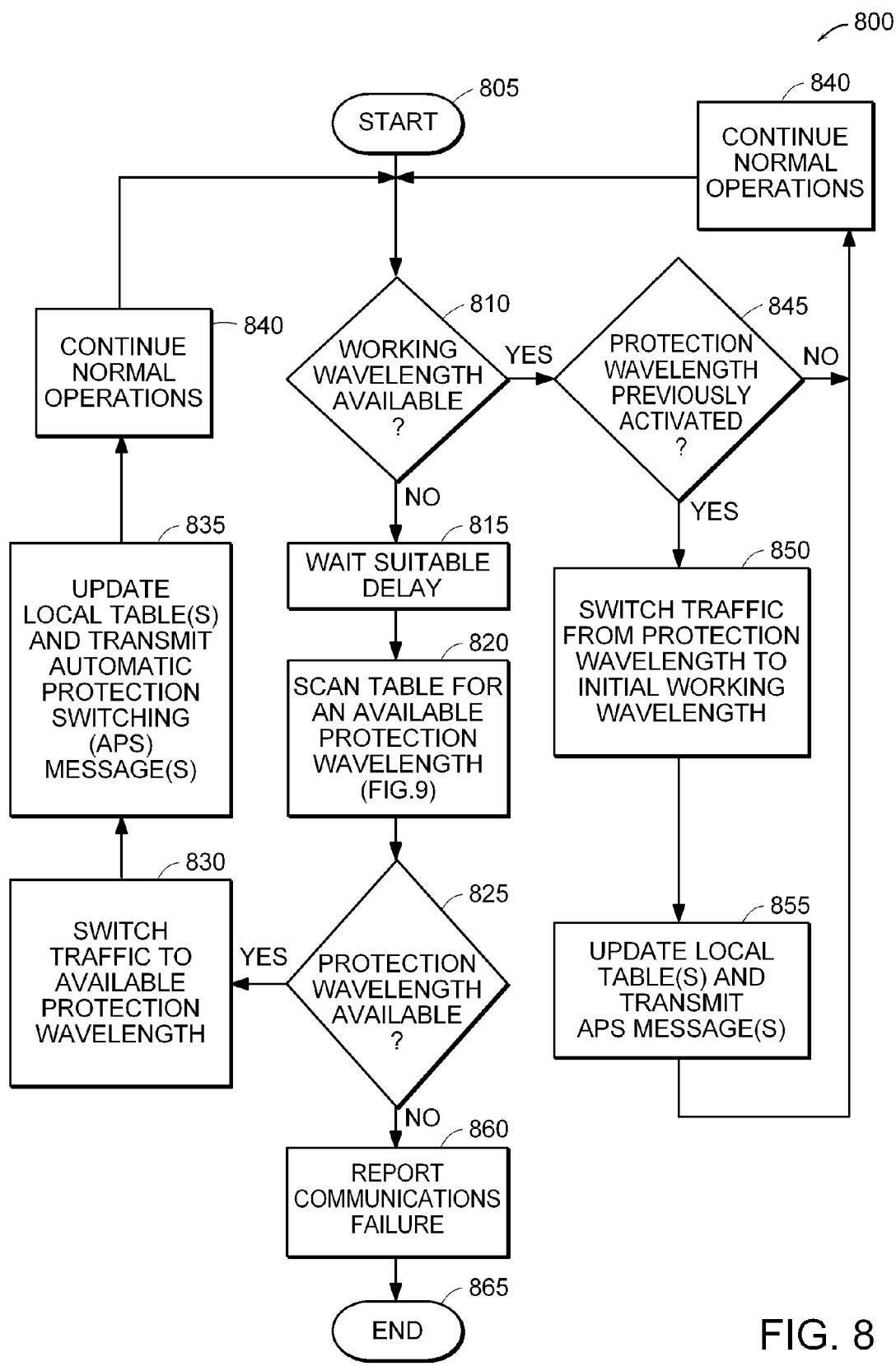
FIG. 8 is a flow diagram of a process employed by network nodes in the network of FIG. 4.

Starting with all "clean" rings, if a failure occurs on λ2, the OCh-iSPRing process waits 100 msec or some other delay time to wait for possible, simultaneous, high priority, wavelength failures and then searches through the preferred routing table looking for a wavelength that is not in use, is not supporting extra traffic, and has a low priority (QoS=3), where QoS means "Quality of Service." In this case, λ4 qualifies to provide protection because In Use=No, Extra Traffic=No and QoS=3. The extra traffic once carried on λ2 is now carried on λ4. The routing table is updated to show a reference lambda index of 2 for λ4. The updated routing table is shown below:

FIG. 8 is a flow diagram of an example process 800 depicting the processes described above in reference to the FIGS. 1-7 and corresponding Tables 1-12 above. The process 800 starts (Step 805) and determines whether a working wavelength is available (Step 810). If the working wavelength is not available (e.g., due to a line cut, network node failure, and so forth), the process 800 continues and waits a suitable delay (e.g., 50 or 100 milliseconds) (Step 815) to avoid a race condition in the case of a large number of simultaneous failures, as described above. The process 800 scans the table or multiple tables for an available protection wavelength (Step 820), further described in reference to FIG. 9 below.

TABLE 11

Table at West side of Node B in FIG. 7

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | | | "Idle" | "!BR & !SW" | 1 |
| 2 | "OCh-iSPRing Protecting" | | | "Yes" | "No" | | "SF" | "Switch" | "BR & SW" | 2 |
| 3 | "OCh-iSPRing Working" | 129 | 1 | | | | | "Idle" | "!BR & !SW" | 1 |
| 4 | "OCh-iSPRing Protecting" | | | "No" | "Yes" | 2 | "SF" | | | 3 |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| n | "Unassigned" | | | | | | | | | |

If a later failure on a high priority wavelength occurs, when the process searches through the protection wavelengths, it looks at the Reference Lambda Index value for λ4. The process then takes into account the ExtraTraffic and QoS values for λ2 in deciding whether or not to preempt this traffic and to switch to protecting for the new failure. In this example, the second failure is on a higher priority wavelength, so the traffic on λ4 is preempted. The new routing table may be configured as follows:

If a protection wavelength is available (Step 825), the process 800 continues by switching traffic to the available protection wavelength (Step 830). Local tables in the node at which the switch is made updates its table(s) and transmits automatic protection switching (APS) messages to inform other nodes in the network of the wavelength switch. The process 800 is then free to continue normal operations (Step 840). If a protection wavelength is not available (Step 825), the process 800 reports a communications failure (Step 860)

TABLE 12

Table at West side of Node B in FIG. 7

| Indexed Lambda Value | Protection Role | Ring ID | Circuit ID | Extra Traffic | In Use | Reference Lambda Index | Failure Priority | State | Substate | Quality of Service |
|---|---|---|---|---|---|---|---|---|---|---|
| 1 | "OCh-iSPRing Working" | 128 | 1 | | | | "SF" | "Switch" | "!BR & !SW" | 1 |
| 2 | "OCh-iSPRing Protecting" | | | "Yes" | "No" | | "SF" | "Switch" | "BR & SW" | 2 |
| 3 | "OCh-iSPRing Working" | 129 | 1 | | | | | "Idle" | "!BR & !SW" | 1 |
| 4 | "OCh-iSPRing Protecting" | 128 | 1 | "No" | "Yes" | 1 | "SF" | | | 3 |
| 5 | "Unassigned" | | | | | | | | | |
| 6 | "Unassigned" | | | | | | | | | |
| 7 | "Unassigned" | | | | | | | | | |
| 8 | "Unassigned" | | | | | | | | | |
| 9 | "Unassigned" | | | | | | | | | |
| . | | | | | | | | | | |
| n | "Unassigned" | | | | | | | | | | then ends (Step 865) or continues in some other manner typically done in loss of communications situations.

Continuing normal operations, the process 800 determines whether the working wavelength is available (Step 810). If a protection wavelength was not previously activated or remains available (Step 845), normal operations continue (Step 840). If a protection wavelength was previously assigned (Step 845), the process 800 switches the traffic from the protection wavelength back to the initial working wavelength (Step 850). The process 800 continues by updating local table(s) and transmitting APS message(s) to the other nodes in the network (Step 855) so that the switch back to the initial working wavelength takes effect. The process 800 continues normal operations (Step 840) after the switch has been made back to the initial working wavelength (Step 850).

Figure 9:
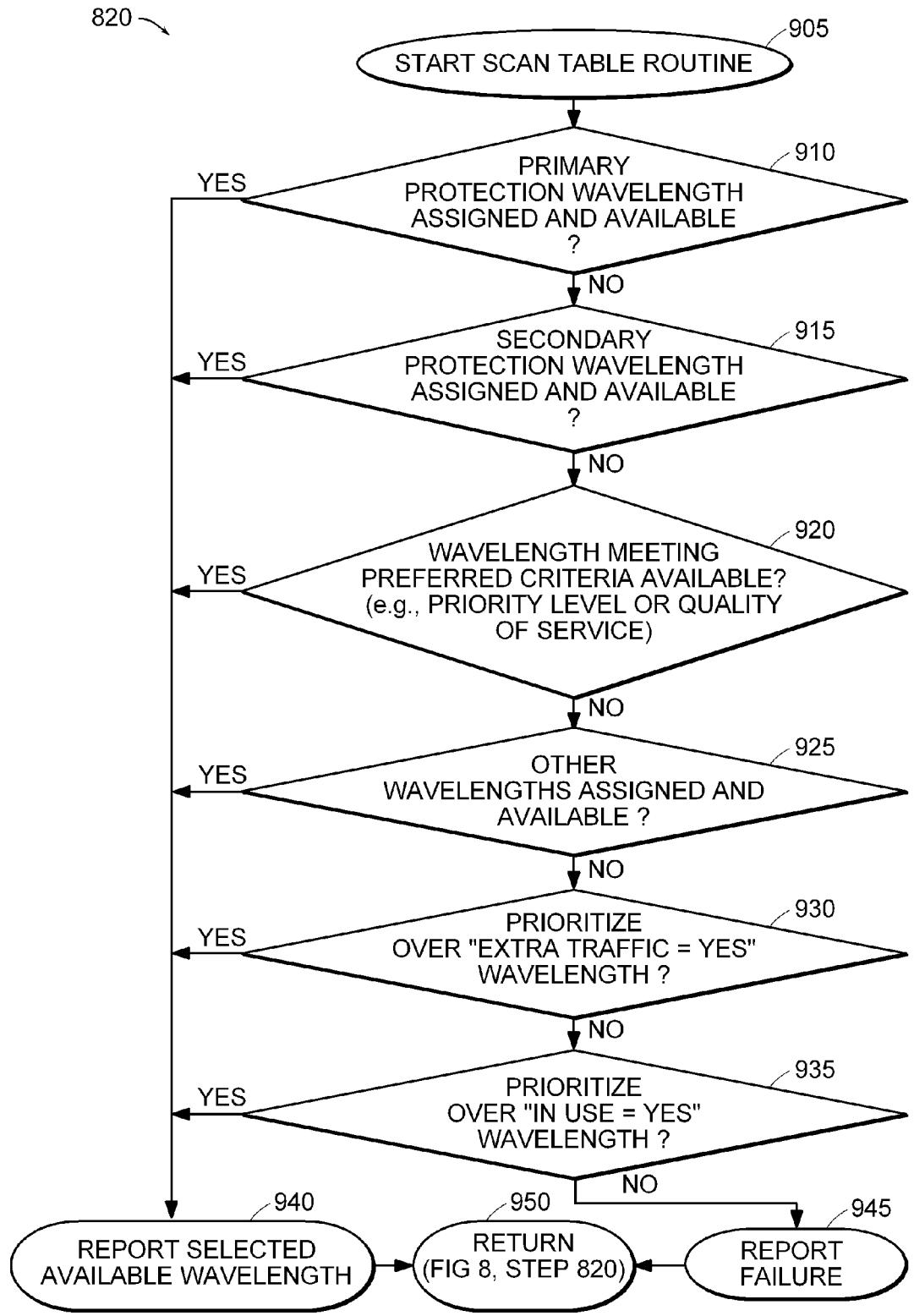
FIG. 9 is a flow diagram of a subprocess employed by the process of FIG. 8.

FIG. 9 is a flow diagram of a detailed scan process 820 for scanning a table for an available protection wavelength. The scan process 820 starts (Step 905) by determining whether a primary protection wavelength is assigned and available (Step 910). If a primary protection wavelength is assigned and available, the scan process 820 reports the primary protection wavelength as being selected (Step 940) and returns (Step 950) to Step 820 in FIG. 8. If a primary protection wavelength is not assigned or is not available, the scan process 820 determined whether a secondary protection wavelength is assigned and available (Step 915). If yes, the scan process 820 continues as described above in reference to the primary protection wavelength.

If a secondary protection wavelength is not assigned or is not available, the scan process 820 continues by determining whether a wavelength meets a preferred criteria and is available (Step 920). A preferred criteria may include meeting a predetermined priority level or Quality of Service (QoS) or any other criteria that may be preset or determined in response to the working wavelength failure. If a wavelength meets the preferred criteria and is available (Step 920), the scan process 820 continues by reporting the selected wavelength (Step 940).

The scan process 820 determines whether any other wavelength is assigned and available (Step 925). If there is another wavelength available, the scan process 820 reports the selected available wavelength (Step 940). The scan process 820 otherwise continues to determine whether failure of the working wavelength has priorities over other wavelengths that may be providing traffic service. For example, failure of the working wavelength may prioritize over "extra traffic=yes" wavelengths (Step 930), or failure of the working wavelength may prioritize over "in use=yes" wavelengths (Step 935).

The scan process 820 may determine priority in the order presented above or some other order depending upon operating conditions or predefined prioritization. If none of the determinations for protection wavelengths yield a selected available wavelength, the scan process 820 reports a failure (Step 945) and then returns (Step 950) to the process 800, step 820 of FIG. 8. It should be understood that reporting a failure (Step 945) may include transmitting an APS message to other nodes and updating local table(s) in the node in which the scan process 820 is operating.

It should be understood that the processes of FIGS. 8 and 9 are merely exemplary. Other embodiments may include changing the ordering of process steps, changing the functions of steps in each of the processes, or combining or eliminating a subset of the process steps.

The processes 800, 820 may be implemented in hardware, firmware, or software. If implemented in software, instructions for executing the processes 800, 820 may be stored, for loading and executing by a suitable processor, on a medium, such as Random Access Memory (RAM), Read-Only Memory (ROM), optical or magnetic storage medium such as a disk, or may be downloaded from another storage medium via suitable communications network. It should also be understood that software used to maintain, scan, and output information in Tables 1-12 may be implemented in software or firmware of various computer languages in a manner similar to the instructions for executing the processes of FIGS. 8 and 9.

While this invention has been particularly shown and described with references to preferred embodiments thereof, it will be understood by those skilled in the art that various changes in form and details may be made therein without departing from the scope of the invention encompassed by the appended claims.

For example, although the processes described herein refer to optical networks, it should be understood that the techniques are also applicable to networks of other frequencies, such as electrical, acoustical, microwave, or radio frequency.

What is claimed is:

1. An optical ring network, comprising:
multiple circuits using a common working wavelength, the multiple circuits having disparate respective origins and destinations in the optical ring network; and
multiple protection wavelengths configured to support the multiple circuits.

2. An optical ring network as in claim 1 wherein the multiple protection wavelengths compose a resource pool.

3. An optical ring network as in claim 2 wherein the resource pool is a shared pool.

4. An optical ring network as in claim 1 wherein one of the multiple protection wavelengths is a primary protection wavelength and is first to support the common working wavelength.

5. An optical ring network as in claim 4 wherein, if the primary protection wavelength is busy, a secondary protection wavelength is selected to support the working wavelength.

6. An optical ring network as in claim 5 wherein the secondary protection wavelength is a primary protection wavelength for another working wavelength.

7. An optical ring network as in claim 1 including nodes with Dense Wave Division Multiplexing (DWDM) interfaces and at least one routing table storing correspondence between working wavelengths, circuits, and protection wavelengths in a dynamic manner.

8. An optical ring network as in claim 7 wherein the table associates priority levels with the protection wavelengths.

9. An optical ring network as in claim 8 wherein the priority levels associated with the protection wavelengths include at least one of the following: Quality of Service, failure priority, or extra traffic.

10. An optical ring network as in claim 1 wherein a subset of the multiple protection wavelengths support the multiple circuits after a predetermined time delay to support multiple simultaneous failures.

11. An optical ring network as in claim 1 wherein a subset of the multiple protection wavelengths support the multiple circuits after a predetermined time delay.

12. A method for performing optical networking protection, comprising:
performing network operations via multiple circuits using a common working wavelength, the multiple circuits having disparate respective origins and destinations; and
supporting the multiple circuits with multiple protection wavelengths.

13. A method as in claim 12 wherein the multiple protection wavelengths compose a resource pool.

14. A method as in claim 12 wherein supporting the multiple circuits includes performing the network operations via a primary protection wavelength.

15. A method as in claim 14 further including determining if the primary protection wavelength is busy and, if so, performing the network operations via a secondary protection wavelength.

16. A method as in claim 15 wherein the secondary protection wavelength is a primary protection wavelength for another working wavelength.

17. A method as in claim 12 further including storing correspondence between working wavelengths, circuits, and protection wavelengths in a dynamic manner.

18. A method as in claim 17 further including associating priority levels with the protection wavelengths.

19. A method as in claim 18 wherein the priority levels include at least one of the following levels: Quality of Service, failure priority, or extra traffic.

20. A method as in claim 12 wherein supporting the multiple circuits occurs after a predetermined time delay for supporting multiple simultaneous failures of the multiple circuits.

21. A node in an optical ring network, comprising:
an interface transmitting and receiving network traffic with an interface of another network node via multiple circuits using a common working wavelength, the multiple circuits having disparate respective origins and destinations in the optical ring network, and the interface configured to transmit and receive the network traffic with the other interface via multiple protection wavelengths in an event communications via the multiple circuits are disrupted.

22. A node as in claim 21 wherein the multiple protection wavelengths compose a resource pool.

23. A node as in claim 21 wherein the interface switches from communicating via a given circuit using the common working wavelength to using a primary protection wavelength.

24. A node as in claim 23 wherein the interface switches to using a secondary protection wavelength if the primary wavelength is busy.

25. A node as in claim 24 wherein the secondary protection wavelength is a primary protection wavelength for another working wavelength.

26. A node as in claim 21 wherein the interface is a Dense Wave Division Multiplexing (DWDM) interface and the network node includes at least one routing table storing correspondence between working wavelengths, circuits, and protection wavelengths in a dynamic manner.

27. A node as in claim 26 wherein the at least one routing table associates priority levels with the protection wavelengths.

28. A node as in claim 27 wherein the priority levels associated with the protection wavelengths include at least one of the following levels: Quality of Service, failure priority, or extra traffic.

29. A node as in claim 21 wherein the interface communicates to the interface on the other network node via a subset of the multiple protection wavelengths after a predetermined time delay to support multiple simultaneous failures.

30. A method of communicating in an optical network, comprising:
transceiving network traffic via multiple circuits using a common working wavelength, the multiple circuits having disparate respective origins and destinations in the optical network; and
communicating via at least one of multiple protection wavelengths in an event communications via at least one of the multiple circuits are disrupted.

31. A method as in claim 30 wherein the multiple protection wavelengths compose a resource pool.

32. A method as in claim 30 wherein communicating via at least one of multiple protection wavelengths includes communicating via a primary protection wavelength.

33. A method as in claim 32 further including determining if the primary wavelength is busy and, if so, communicating via a secondary protection wavelength.

34. A method as in claim 33 wherein the secondary protection wavelength is a primary protection wavelength for another working wavelength.

35. A method as in claim 30 further including storing correspondence between at least one working wavelength, circuits, and the protection wavelengths in a dynamic manner.

36. A method as in claim 35 further including associating priority levels with the protection wavelengths.

37. A method as in claim 36 wherein the priority levels include at least one of the following levels: Quality of Service, failure priority, or extra traffic.

38. A method as in claim 30 wherein communicating via at least one of multiple protection wavelengths occurs after a predetermined time delay for supporting multiple simultaneous failures of the multiple circuits.

* * * * *